US008239704B2

(12) United States Patent
Scott et al.

(10) Patent No.: US 8,239,704 B2
(45) Date of Patent: Aug. 7, 2012

(54) GLOBAL CLOCK VIA EMBEDDED SPANNING TREE

(75) Inventors: Steven L. Scott, Chippewa Falls, WI (US); Dennis C. Abts, Eleva, WI (US); Aaron F. Godfrey, Eagan, MN (US)

(73) Assignee: Cray Inc., Seattle, WA (US)

( * ) Notice: Subject to any disclaimer, the term of this patent is extended or adjusted under 35 U.S.C. 154(b) by 390 days.

(21) Appl. No.: 12/483,886

(22) Filed: Jun. 12, 2009

(65) Prior Publication Data
US 2010/0318831 A1    Dec. 16, 2010

(51) Int. Cl.
*G06F 1/04* (2006.01)
(52) U.S. Cl. .......................... 713/600; 713/500
(58) Field of Classification Search .......... 713/500–600; 370/500
See application file for complete search history.

(56) References Cited

U.S. PATENT DOCUMENTS

2009/0290511 A1* 11/2009 Budampati et al. ........... 370/254

* cited by examiner

*Primary Examiner* — Brian Misiura
*Assistant Examiner* — Kim Huynh
(74) *Attorney, Agent, or Firm* — Perkins Coie LLP

(57) ABSTRACT

In some embodiments, the present invention relates to a method of maintaining a global clock within a multiprocessor system having a plurality of nodes that are connected in a network via links. A virtual spanning tree is mapped onto the network and the nodes and the links are configured such that each node is in a parent-child relationship with one or more other nodes in the virtual spanning tree. A global clock is generated in a root of the virtual spanning tree and global clock signals are communicated down the virtual spanning tree to each of the nodes.

16 Claims, 7 Drawing Sheets

Fig. 7

| FIELD | NAME | SIZE | DESCRIPTION |
|---|---|---|---|
| L | LCB | 1 | CONTAINED IN BIT 0 OF EVERY PHIT. USED FOR THE LCB CONTROL CHANNEL. |
| P | PHIT TYPE | 1 | CONTAINED IN BIT 1 OF EVERY PHIT. 0=TAIL/IDLE. 1=PACKET DATA IF BIT 1 IS 0 THEN BIT 2 DETERMINES WHETHER PHIT IS AN IDLE (BIT 2 = 0) OR EOP (BIT 2 = 1) |
| V | VIRTUAL NETWORK | 1 | VIRTUAL NETWORK FOR THIS PACKET (VN0 FOR REQ AND VN1 FOR RESP) |
| R | ROUTE METHOD | 1 | SET TO 1 FOR VECTOR-ROUTED PACKETS |
| OP | OPCODE | 2 | TYPE OF VECTOR-ROUTED PACKET (00 = NORMAL VRP, 01 = GLOBAL CLOCK 10 = BARRIER JOIN, 11 = BARRIER NOTIFY). THE BARRIER AND GLOBAL CLOCK VERSIONS OF VECTOR ROUTED PACKETS ARE SINGLE PHIT (PLUS CRC) |
| PORT | PORT | 6 | SET BY LOCAL BLOCK TO EXIT PORT FOR THIS ROUTER. ON WAY INTO ROUTER SET TO INPUT PORT NUMBER. |
| H | HOME | 1 | IF SET, INDICATES THAT PACKET HAS REACHED ITS DESTINATION. THERE IS A HOME BIT ASSOCIATED WITH EACH HOP SPECIFIER IN THE VECTOR ROUTE. |
| L | VISITED_LB | 1 | SET TO 1 WHEN LEAVING THE LCB (SO PACKET SHOULD ROUTE TO EXIT PORT). SET TO 0 WHEN ENTERING ROUTER (SO PACKET SHOULD ROUTE TO LOCAL BLOCK). |
| BAR | VIRTUAL BARRIER NUMBER | 8 | FOR BARRIER JOINS AND NOTIFIES, SPECIFIES THE VIRTUAL BARRIER NUMBER TO WHICH IT APPLIES. |

GLOBAL CLOCK VIA EMBEDDED SPANNING TREE

FEDERALLY SPONSORED RESEARCH OR DEVELOPMENT

The U.S. Government has a paid-up license in this invention and the right in limited circumstances to require the patent owner to license others on reasonable terms as provided for by the terms of contract No. MDA904-02-3-0052, awarded by the Maryland Procurement Office.

BACKGROUND OF THE INVENTION

1. Field of the Invention

The present invention is related to multiprocessor computer systems, and more particularly to global clock management within a multiprocessor computer system.

2. Background Information

Large-scale multiprocessor systems typically need to coordinate many separate processing elements in a way that allows processing elements to cooperate. As part of this type of coordination, the operating systems of such multiprocessor systems should help to improve performance among the cooperating processing elements. In addition, the operating systems of such multiprocessor systems should minimize any interference with application programs that are running on separate processing elements.

One useful way to minimize interference between an operating system and any application programs is to maintain a common time base among the separate processing elements. Maintaining a common time base among the separate processing elements helps to keep communication between the application programs synchronized. In addition, scheduling operating system services in a non-disruptive manner (i.e., by keeping the services synchronized across the nodes) allows each application to stay more synchronized.

In some multiprocessor systems, the operating system uses a periodic interrupt called a system timer to maintain proper operation. While this timer is required for operation, it causes interference with the running application. A common global clock allows operating system timer interrupts to be lined up across all the nodes such that the applications running on the nodes are all interfered with at roughly the same time. Lining up the operating system timer interrupts across all of the nodes also reduces the overall operating system overhead for applications that perform frequent inter-processor synchronization. In addition, a common global clock may be useful for debugging code involving communication between nodes.

One approach for synchronizing nodes in large-scale multiprocessor systems is to use a separate virtual channel within the network fabric. Each node in the network fabric exchanges a timestamp with their parent node. The systems synchronize by measuring the round trip time across each of the respective links.

In one such approach, the respective timestamps between peer nodes within the network fabric establishes time deltas between the peer nodes. Keeping track of these time deltas between the peer nodes using iterative data collection and calculation allows the entire multiprocessor system to maintain a common timescale.

One of the deficiencies of this approach is that it requires a dedicated separate virtual channel to avoid queuing delays on the links between the peer nodes within the network fabric. What is needed is a system and method for global clock management within a multiprocessor computer system which does not require a dedicated separate virtual channel.

BRIEF DESCRIPTION OF THE DRAWINGS

FIG. 7 illustrates example codes and fields for a clock packet.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

A multiprocessor computer system is a collection of interconnected processor nodes that coordinate their computation to solve computationally difficult problems. Each processor node typically includes one or more processors; the nodes conceptually are placed at the vertices of a directed graph that represents the links connecting peer processor nodes. The topology of the network describes how the individual processor nodes communicate with each other (e.g. how signals are routed and flow control is performed). A number of common topologies exist for parallel computers, such as k-ary n-cubes (e.g. torus, mesh and hypercube) and fat-trees (also known as a folded-Clos) among others.

Figure 1:
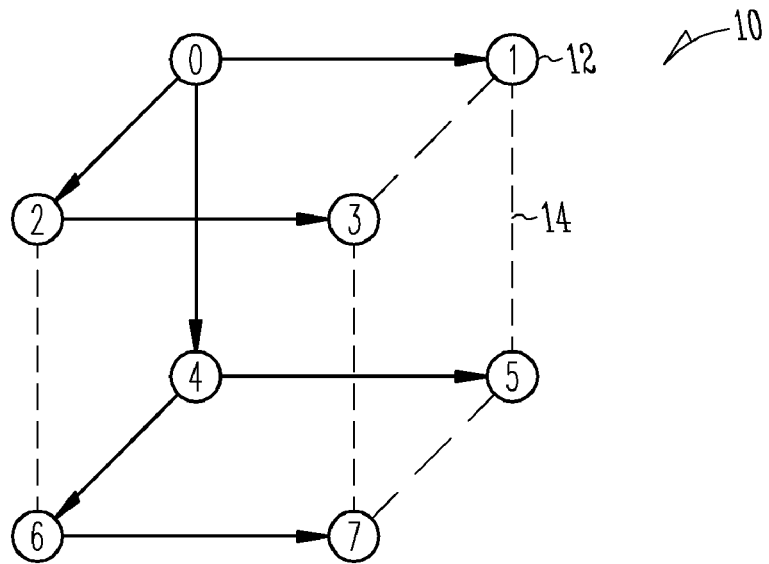
FIG. 1 illustrates an example order three hypercube multicomputer.

An example of an order three hypercube 10 is shown in FIG. 1. Hypercube 10 includes processor nodes 12 connected by links 14.

One efficient way to propagate a global clock through all of the nodes of a hypercube is to use a virtual spanning tree. A virtual spanning tree is a tree formed by the minimum number of links needed to connect all processor nodes. By definition, a spanning tree contains no cycles.

Figure 2:
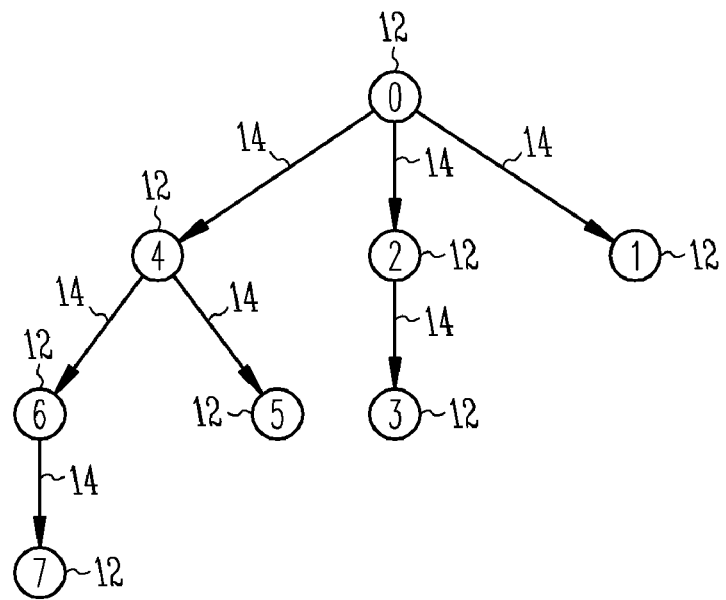
FIG. 2 illustrates an example spanning tree that overlays the order three hypercube multicomputer shown in FIG. 1.

FIG. 2 shows an example of a virtual spanning tree that may be overlaid onto the order three hypercube 10 illustrated in FIG. 1. As shown in FIG. 2, the spanning tree includes a set of nodes 12 (numbered 0-7 in FIG. 2) that are interconnected by links 14. The spanning tee is also shown as solid lines mapped on top of links 14 in FIG. 1. It should be noted that the virtual spanning tree may also be overlaid on a fat-tree (i.e., folded-Clos) topology, or any number of other topologies.

In the example shown in FIGS. 1 and 2, every processor node 0-7 in the spanning tree has the ability to generate a clock locally. However, independent clocks may drift over time and become inconsistent. Therefore, it is desirable to propagate a single global clock signal that is generated from a root node (e.g., see root node 0 in FIG. 2). In the example shown, the root (node 0) of the spanning tree fans out the global clock signal to all of the nodes 1-7 in the rest of the system by propagating the global clock signals down the spanning tree.

Each node 12 in the network maintains memory mapped control registers (MMRs) 102 and 104 that identify a parent node and one or more child nodes. A node 12 without a parent node acts as the root in the virtual spanning tree. Similarly, if a link to its parent is broken, the node acts as root for itself and for any designated children.

Figure 3:
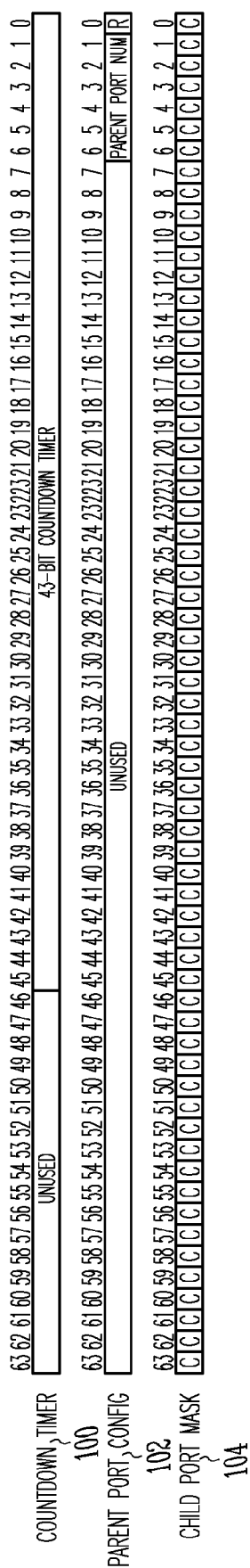
FIG. 3 illustrates example memory mapped control registers.

FIG. 3 shows an example set of memory mapped control registers 100, 102 and 104. MMR 100 includes countdown timer field 106 that stores an integer number used to reset a global clock countdown timer. In one such embodiment, the processor node generates a global clock signal each time the counter reaches zero. It also resets the counter to the value stored in MMR 100.

In the embodiment shown in FIG. 3, each processor node 12 includes sixty-four input ports and 64 output ports. Each port is connected to another processor 12 through a link 14. In the embodiment shown, MMR 102 includes a single bit root indicator field 108 and a parent port number field 110. The root indicator field bit indicates whether the processor node is the root of the spanning tree. If so, the processor node sources the global clock packet. If the processor node is not the root, the node looks to the port number stored in parent port number field 110 to determine the port that will receive a global clock packet.

In one embodiment, MMR 100 and 102 are combined in a single MMR.

In the embodiment shown in FIG. 3, MMR 104 includes sixty-four child indicator bits 112 (one for each output port). Each bit indicates whether its particular port is to be used to transmit the global clock packet from the processor node. The large number of input and output ports supported in this example system can be used advantageously to limit the amount of time it takes to traverse the entire virtual spanning tree.

In some embodiments, the method includes configuring connections between the processor nodes as a virtual spanning tree such that each processor node is in a parent-child relationship. The method further includes generating a global clock in a root of the spanning tree and communicating global clock signals down the virtual spanning tree to each of the nodes.

It should be noted that the global clock signals may be communicated from the root down the virtual spanning tree to each of the nodes in more than one manner. In some embodiments, the global clock signals may be communicated by propagating pulses down the connections to each of the nodes. In other embodiments, the global clock signals may be communicated by propagating packets (or piggybacked fields within the packets) down links 14 to each of the nodes 12.

As noted above, generating a global clock in a root of the spanning tree may include decrementing a countdown timer on each tick of a system clock in the root. As an example, each node in the virtual spanning tree may have a configurable global clock period such that if a particular node is designated as the root (e.g., node 0 in the spanning tree shown in FIG. 2), then the root decrements a countdown timer (e.g., a 43-bit countdown timer) on each tick of the system clock.

In some embodiments, decrementing a countdown timer on each tick of a system clock in the root may include decrementing the countdown timer until the countdown timer reaches 0 and then generating a global clock signal. In addition, generating a global clock in a root of the spanning tree may further include re-loading the countdown timer with a configured global clock period (e.g., in units of system clock cycles).

It should be noted that decrementing a countdown timer may include ignoring the countdown timer within those nodes that are not designated as the root. When each node receives a global clock signal from its respective parent, each node sends a global clock signal to each of its children that is identified in the associated memory mapped control register.

Figure 4:
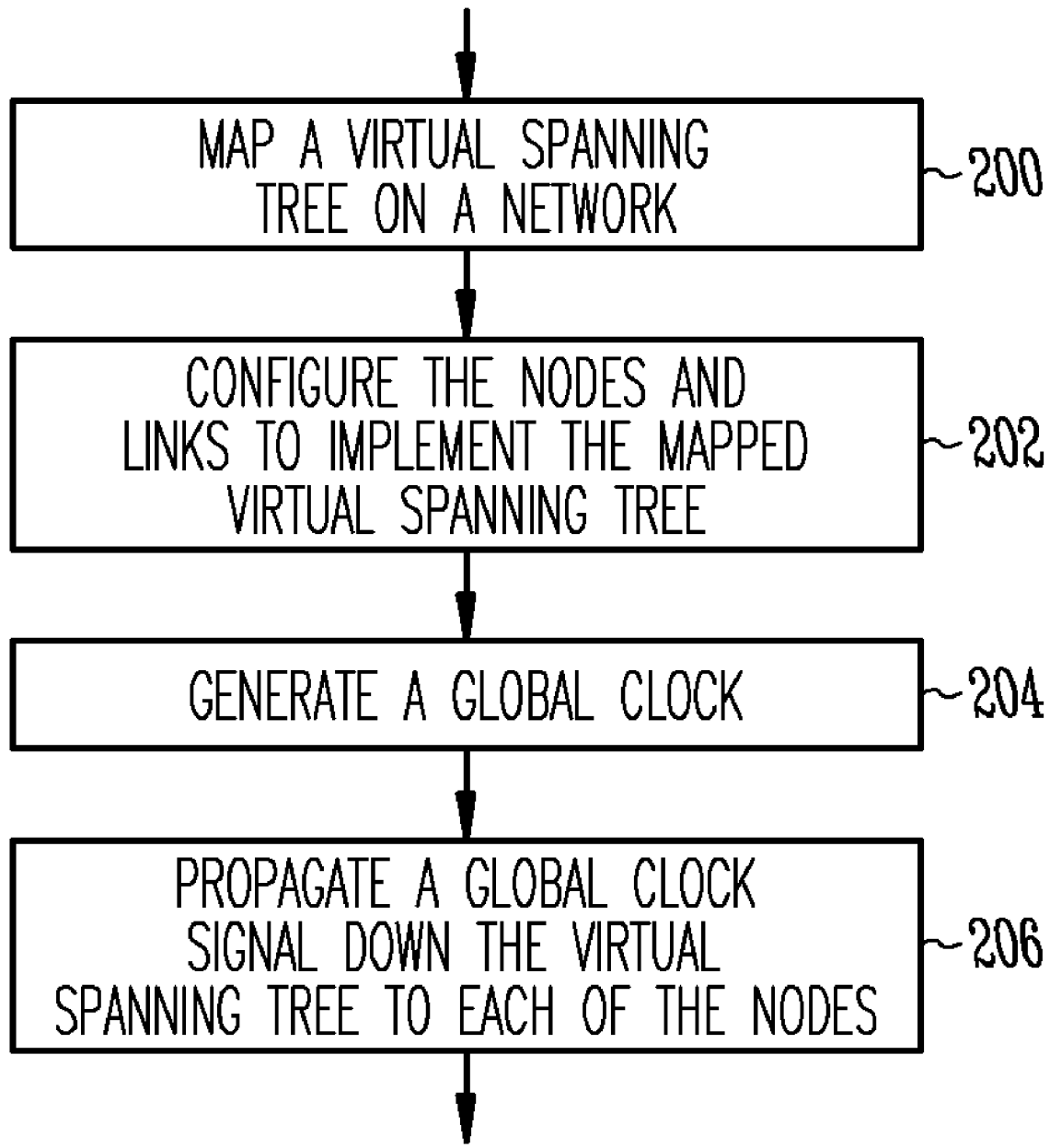
FIG. 4 illustrates an example method of maintaining a global clock within a multiprocessor system having a plurality of nodes that are connected in a network via links.

A method of maintaining a global clock within a multiprocessor system having a plurality of nodes that are connected in a network via links, wherein the plurality of nodes includes a first node and a second node, is shown in FIG. 4.

A virtual spanning tree is mapped onto the network at 200. At 202, the nodes and the links are configured such that each node is in a parent-child relationship with one or more other nodes in the virtual spanning tree. At 204, a global clock is generated in a root of the virtual spanning tree and, at 206, global clock signals are communicated down the virtual spanning tree to each of the nodes.

Figure 5:
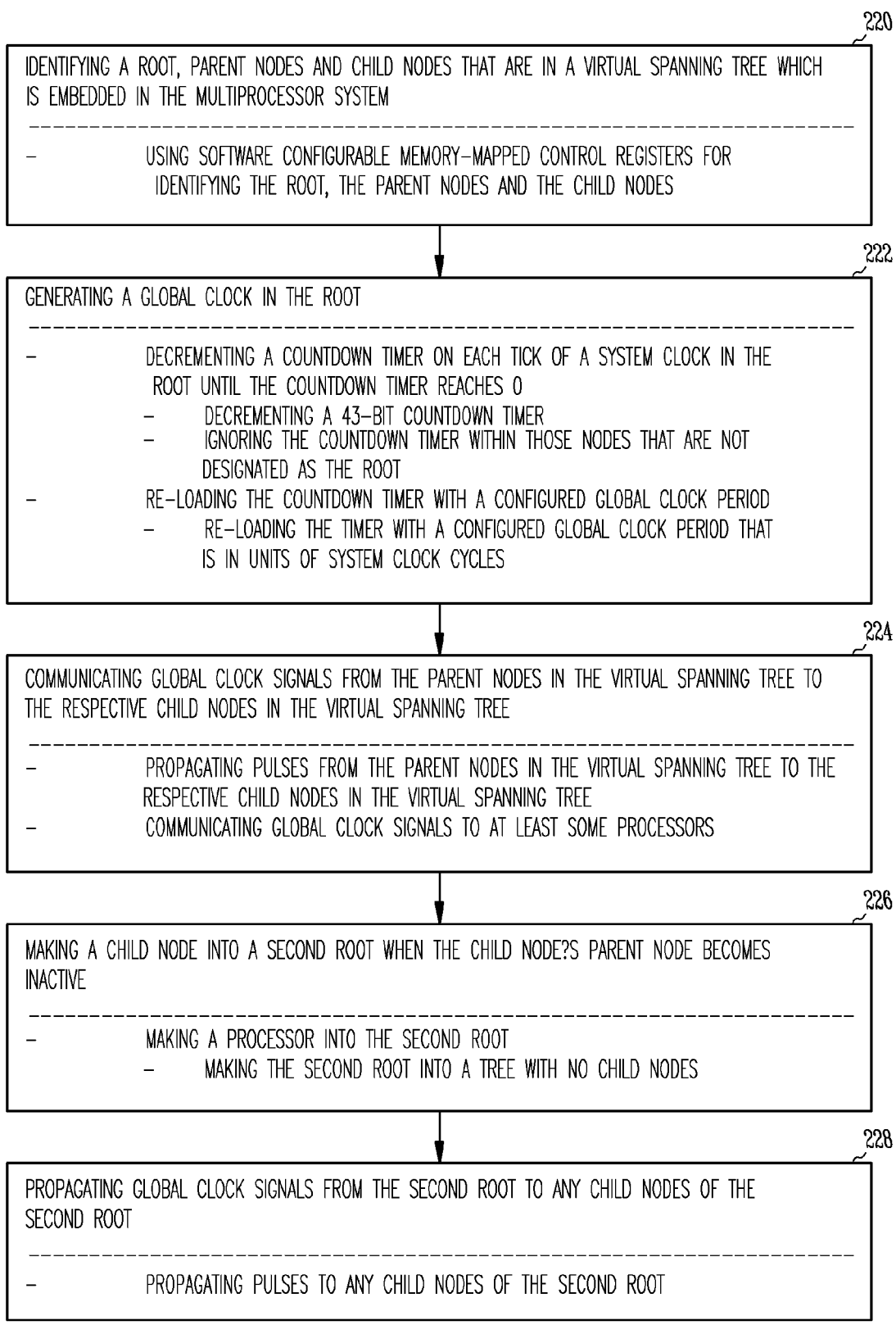
FIG. 5 shows an example method of maintaining a global clock within a multiprocessor system that has a plurality of nodes connected via links.

A method of mapping a spanning tree over the nodes via the links such that each node is in a parent-child relationship is shown in FIG. 5. In one such embodiment, software configurable memory-mapped control registers are used, at 220, to identify the root, the parent nodes and the child nodes within the spanning tree (see, e.g., registers 102 and 104 shown in FIG. 3). If a node is designated as the root, a global clock is generated at 222. In one embodiment, a global clock signal is generated by a processor on the root node as a function of a global clock generated within that processor.

As shown in FIG. 5, at 224, global clock signals are communicated from parent nodes to their respective child nodes. If a child node does not receive its expected global clock signal, it begins to generate its own global clock at 226 and, at 228, propagates a global clock signal as a function of its global clock to its children.

In one embodiment, a child node determines that it is disconnected from the global clock signal if it detects that the link has failed. In another embodiment, a timeout mechanism is used to detect a failure to receive the latest global clock signal.

It should be noted that each processor nodes in the virtual spanning tree may include one or more processors. Therefore, communicating global clock signals down the virtual spanning tree to each of the nodes may include communicating global clock signals to one or more of the processors in each node in the virtual spanning tree.

Figure 6:
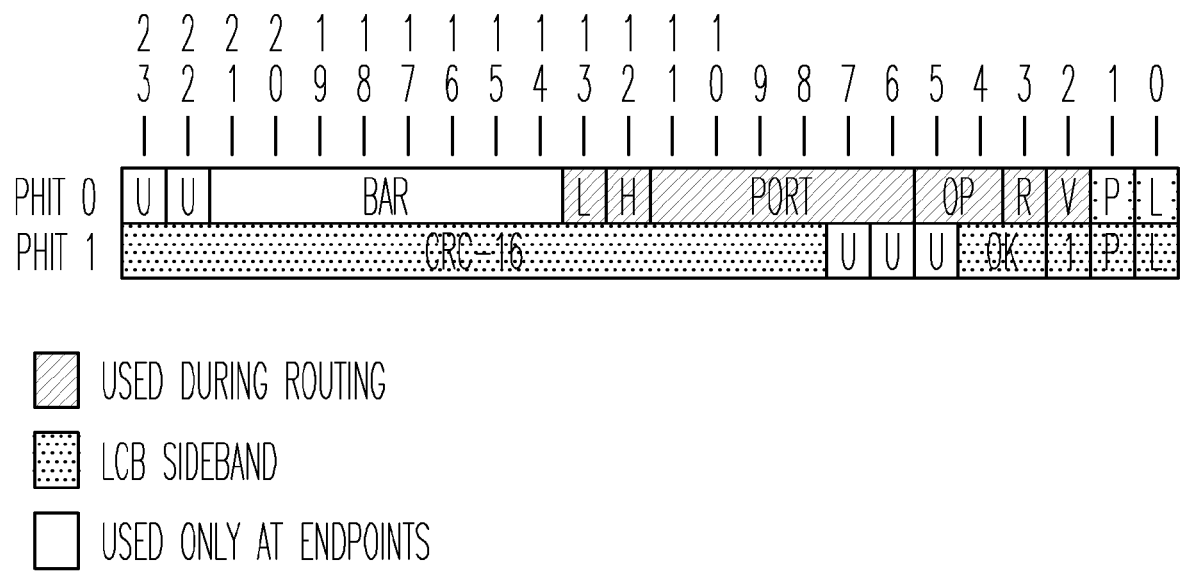
FIG. 6 illustrates an example clock packet.

In some embodiments, each node uses a special "global clock" packet to communicate the global clock signal to its children (see, e.g., clock packet shown in FIG. 6). As an example, the opcode field in phit 0 may be set to 01 to indicate that this packet is a "global clock" packet and should be processed accordingly. Other example codes and fields are shown in FIG. 7.

In some embodiments, the packets may be divided into 24-bit phits for transmission over internal datapaths. These phits are further serialized for transmission over 3-bit wide network channels. As examples, a packet may contain 2 phits carrying 22 payload bits, or 4 phits carrying 32 payload bits. It should be noted that the number of phits as well as the number of payload bits that are carried by the phits will depend in part on a variety of design considerations that are associated with the multiprocessor computer system.

In addition, longer packets may be constructed by inserting additional payload phits before the tail phit. Two-bits of each phit, as well as all of the tail phit may be used by the data-link layer.

In some embodiments, the head phit of the packet controls routing. In addition to specifying the destination, this phit contains a v bit that specifies which virtual channel to use, and three bits, h, a, and r, that control routing.

Some example methods for routing the packets are shown and described in "LOAD BALANCING FOR COMMUNICATIONS WITHIN A MULTIPROCESSOR COMPUTER SYSTEM," U.S. patent application Ser. No. 12/107,019, filed Apr. 21, 2008, as well as "HIGH-RADIX INTERPROCESSOR COMMUNICATIONS SYSTEM AND METHOD," U.S. patent application Ser. No. 12/107,011, filed Apr. 21, 2008, the descriptions of which is incorporated herein by reference.

The methods and computer systems described herein may allow for a failed node and/or link to be tolerated with regard to clock management within a multiprocessor computer system. As shown in FIG. 5, the method may further include (i) making a child node into a second root that has its own sub-tree when the child node fails to receive a global clock signal from its parent node; and (ii) communicating global clock signals from the second root down the sub-tree to each of the nodes in the sub-tree. In some embodiments, communicating global clock signals from the second root down the sub-tree to each of the nodes in the sub-tree may include propagating packets from the second root down the sub-tree to each of the nodes in the sub-tree.

Figure 8:
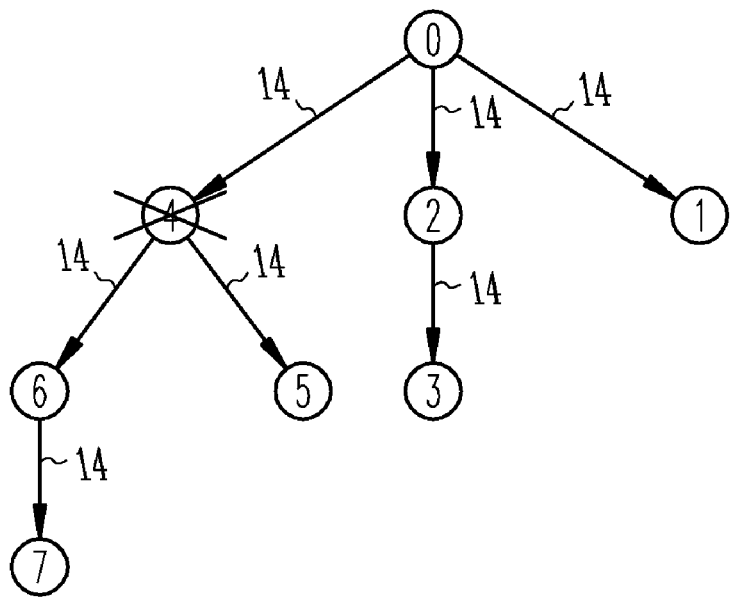
FIG. 8 illustrates an example virtual spanning tree that shows where if a parent node goes down, then child nodes assume the role of a root for their respective sub-trees.

FIG. 8 illustrates an example virtual spanning tree that shows a situation where a parent node (e.g., node 4) goes down (i.e., becomes inactive for any reason), and all of the corresponding child nodes (i.e., nodes 5 and 6) assume the role of a root for their respective sub-trees. Once the parent node becomes inactive, each of the child nodes that have become roots begins propagating clock signals to their respective children. It should be noted that making a processor into the second root may include making the second root into a tree with no child nodes if the second root has no children and the second root's parent becomes inactive (see, e.g., node 5 in FIG. 8). Depending on the configuration of the virtual spanning tree, one or more additional roots (i.e., third, fourth, fifth, etc.) may be formed with varying levels of respective sub-trees formed beneath each of the additional roots. In addition, making a child node into a second root that has its own sub-tree when the child node fails to receive a global clock signal from its parent node may include making a processor into the second root. As an example, some endpoints of the spanning tree may be processors that have a locally generated clock which takes over if their corresponding parent node goes down. It should be noted that in such a case, the resulting sub-tree would include a single root with no children (e.g., node 5 in FIG. 8).

FIG. 8 illustrates an example scenario where a parent node becomes inactive such that the associated child nodes assume the role of root for their respective subtrees. Another type of example scenario can arise when a link L between a parent node and a child node goes down (see, e.g., link L between nodes 4 and 6 in FIG. 9).

Figure 9:
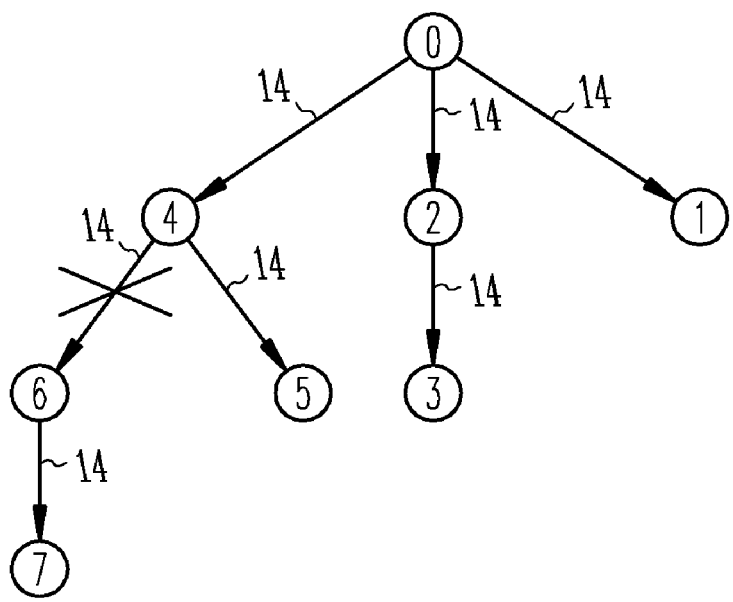
FIG. 9 illustrates an example virtual spanning tree that shows where, if a link between a parent node and a child node goes down, then the child nodes assume the role of a root for its respective sub-tree.

As shown in FIG. 9, the child node 6 that is associated with the failed link L assumes the role of a root for its subtree. It should be noted that no matter what type of scenario exists which prevents a global clock signal from being sent from a parent node to a child node, the child node is able to detect whether (i) the link from the parent has gone down; and/or (ii) there is a malfunction in the parent node.

The methods and computer systems described herein may provide flexibility for configuring a global spanning tree that is overlaid onto a multiprocessor computer system. In some embodiments, software may setup a high degree global clock tree. The resulting spanning tree may therefore be a relatively shallow global spanning tree that has less variance in the time differences between the root and the various endpoint leaves.

In addition, depending on the particular embodiment, there may not be any additional physical networking hardware that is required in order to handle the global clock management within the network fabric. The need for additional physical networking hardware is eliminated because of the ability of the system to sink global clock signals at each node. It should be noted that the ability of the system to sink global clock signals at each internal node also means that there is never any backpressure applied on the transmission of global clock signals.

The methods described above may be incorporated into an article that includes a computer readable medium. In some embodiments, the computer readable medium includes instructions thereon such that when the instructions are executed in a computer the computer performs the methods described above.

Some examples of router microarchitecture that may be used in the multiprocessor computer system are described in J. Kim, et al. in "Microarchitecture of a high-radix router," *ISCA '05: Proceedings of the 32nd Annual International Symposium on Computer Architecture*, pages 420-431, Madison, Wis., USA, 2005. IEEE Computer Society. Other examples of router microarchitectures are shown and described in the "HIGH-RADIX INTERPROCESSOR COMMUNICATIONS SYSTEM AND METHOD" patent application described above, the description of which is incorporated herein by reference.

The approach described above provides a mechanism for propagating global clock signals through the entire system, even when there is a fault within the system. In addition, the approach does not require additional physical or virtual channel resources.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of maintaining a global clock within a multiprocessor system having a plurality of nodes that are connected in a network via links, wherein the plurality of nodes includes a first node and a second node, the method comprising:

mapping a virtual spanning tree onto the network;

configuring the nodes and the links such that each node is in a parent-child relationship with one or more other nodes in the virtual spanning tree;

generating a global clock in a root node of the virtual spanning tree;

communicating from the root node global clock signals based on the generated global clock of the root node down the virtual spanning tree to each of the nodes; and when a child node detects that the link between that child node and a parent node of that child node has failed, generating at that child node its own clock; and propagating from that child node clock signals based on its own generated clock down the virtual spanning tree to descendant nodes of that child node.

2. The method of claim 1, wherein communicating global clock signals down the virtual spanning tree to each of the nodes includes propagating packets from parent nodes in the virtual spanning tree to their respective child nodes.

3. The method of claim 1, wherein configuring the nodes and the links such that each node is in a parent-child relationship includes using software configurable memory-mapped control registers to identify the root node, the parent nodes and the child nodes.

4. The method of claim 1, wherein generating a global clock in the root node of the spanning tree includes decrementing a countdown timer on each tick of a system clock in the root until the countdown timer reaches 0.

5. The method of claim 4, wherein generating a global clock in the root node of the spanning tree further includes re-loading the countdown timer with a predefined global clock period.

6. The method of claim 5, wherein re-loading the timer with a predefined global clock period includes re-loading the timer with a predefined global clock period that is in integer units of system clock cycles.

7. The method of claim 4, wherein decrementing a countdown timer on each tick of a system clock in the root node includes ignoring the countdown timer within those nodes that are not designated as being a root node.

8. The method of claim 1, wherein each node includes one or more processors and wherein communicating global clock signals down the virtual spanning tree to each of the nodes includes communicating global clock signals to at least one or more processors.

9. A multiprocessor computer system, comprising:
a plurality of processor nodes, including a first node and a second node;
links connecting each of the plurality of processor nodes, the first node being connected to the second node via a link;
means for configuring the nodes and the links such that each node is in a parent-child relationship with one or more other nodes in a virtual spanning tree;
a first global clock signal generator of the first node, wherein the first global clock signal generator transmits a first global clock signal down the virtual spanning tree to each of the nodes including the second node; and
a second global clock signal generator of the second node, wherein when the second node detects that the link connecting the first node to the second node has failed resulting in the second node being unable to receive the first global clock signal, the second global clock generator transmits a second global clock signal down the virtual spanning tree to each descendant node of the second node.

10. The system according to claim 9, wherein the global clock signal generator includes means for propagating packets from the parent nodes in the virtual spanning tree to the respective child nodes in the virtual spanning tree.

11. The system according to claim 10, wherein the generating means includes means for propagating a global clock signal from the first node to each of its children.

12. The system according to claim 9, wherein the means for configuring the nodes and the links includes software configurable memory-mapped control registers located in each processor node, wherein the memory-mapped control registers indicate if the processor node is a root.

13. The system according to claim 9, wherein the means for configuring the nodes and the links includes software configurable memory-mapped control registers located in each processor node, wherein the memory-mapped control registers identify a parent and one or more children for each processor node.

14. The system according to claim 9, wherein the global clock signal generator includes means for decrementing a countdown timer on each tick of a system clock and means for re-loading the countdown timer with a predefined global clock period when needed.

15. A method performed in a node of a network of nodes connected by links, the method for propagating global clock signals to other nodes in the network, the method comprising:
maintaining an indication of a parent node of the node, the node being connected to the parent node via a link;
maintaining indications of child nodes of the node, the node being connected to each child node via a link;
upon receiving a global clock signal at the node from the parent node via the link connecting the node to the parent node,
synchronizing the node with other nodes of the network based on the received global clock signal; and
propagating the received global clock signal from the node to the child nodes via the links connecting the node to the child nodes; and
upon detecting at the node that the link connecting the node to the parent node has failed,
generating a clock signal at the node; and
propagating the generated clock signal from the node to the child nodes via the links connecting the node to the child nodes.

16. The method of claim 15 wherein the indications of parent and child nodes maintained by the nodes of the network form a spanning tree of the network, the spanning tree having a root node that generates that global clock signal and propagates the global clock signal via links of the spanning tree to the nodes of the network and wherein the node functions as a root node of a subtree of the spanning tree upon detecting that the link connecting the nodes to the parent node has failed.

* * * * *

UNITED STATES PATENT AND TRADEMARK OFFICE
CERTIFICATE OF CORRECTION

| | | |
|---|---|---|
| PATENT NO. | : 8,239,704 B2 | Page 1 of 1 |
| APPLICATION NO. | : 12/483886 | |
| DATED | : August 7, 2012 | |
| INVENTOR(S) | : Scott et al. | |

It is certified that error appears in the above-identified patent and that said Letters Patent is hereby corrected as shown below:

On the title page, illustrative figure and in drawing sheet 4 of 7. In reference numeral 226 box, line 1, delete "NODE?S" and insert -- NODE'S --, therefor.

In the Claims
In column 8 line 49, in claim 16 delete "that global" and insert -- the global --, therefor.

Signed and Sealed this
Twenty-third Day of April, 2013

Teresa Stanek Rea
*Acting Director of the United States Patent and Trademark Office*